Jan. 6, 1953          E. C. McRAE          2,624,215
VEHICLE TRANSMISSION
Filed Sept. 28, 1949                                 7 Sheets-Sheet 1
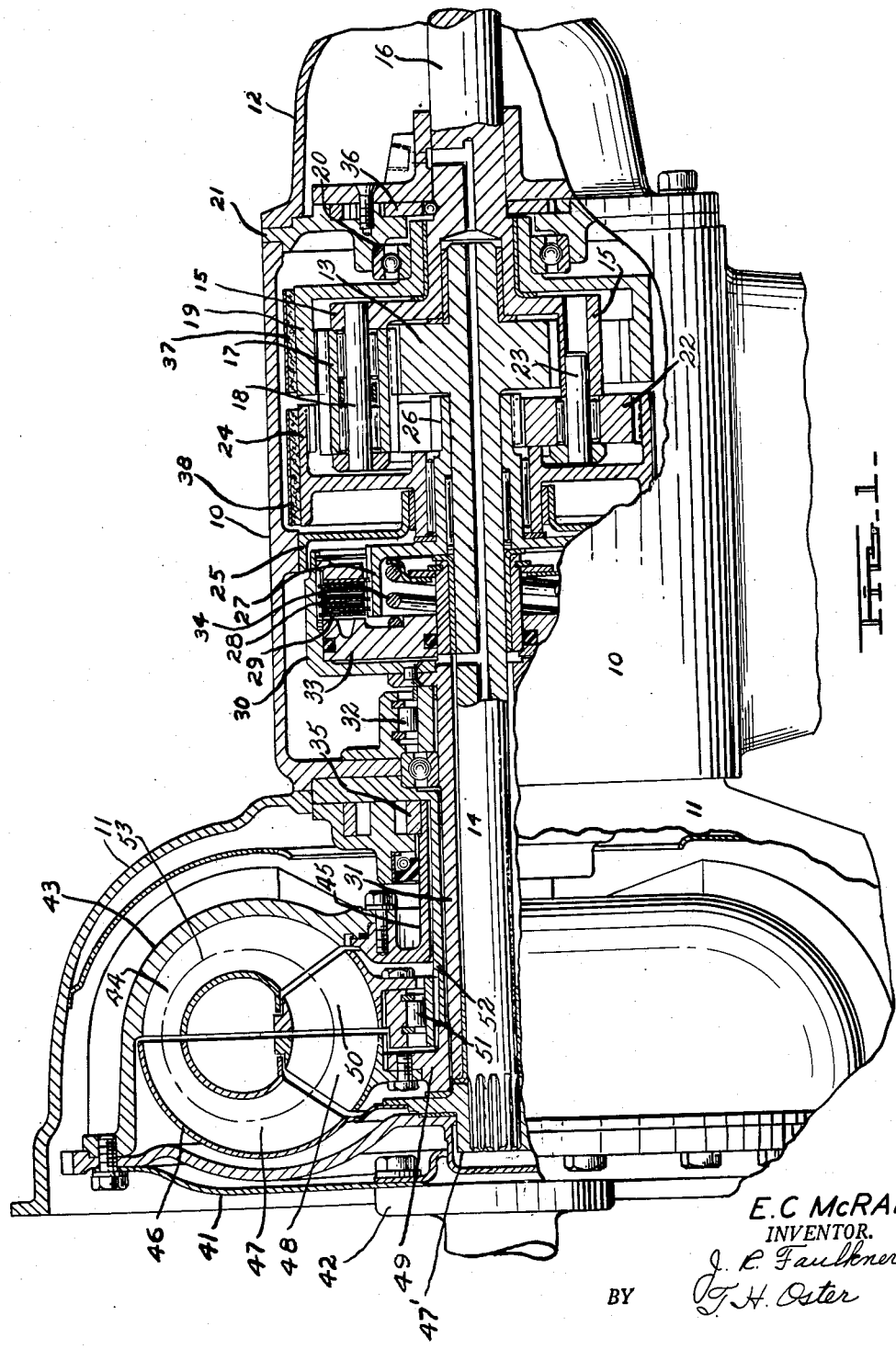
E. C. McRAE
INVENTOR.
BY J. R. Faulkner
F. H. Oster
ATTORNEYS Jan. 6, 1953                E. C. McRAE                2,624,215
VEHICLE TRANSMISSION
Filed Sept. 28, 1949                                     7 Sheets-Sheet 2
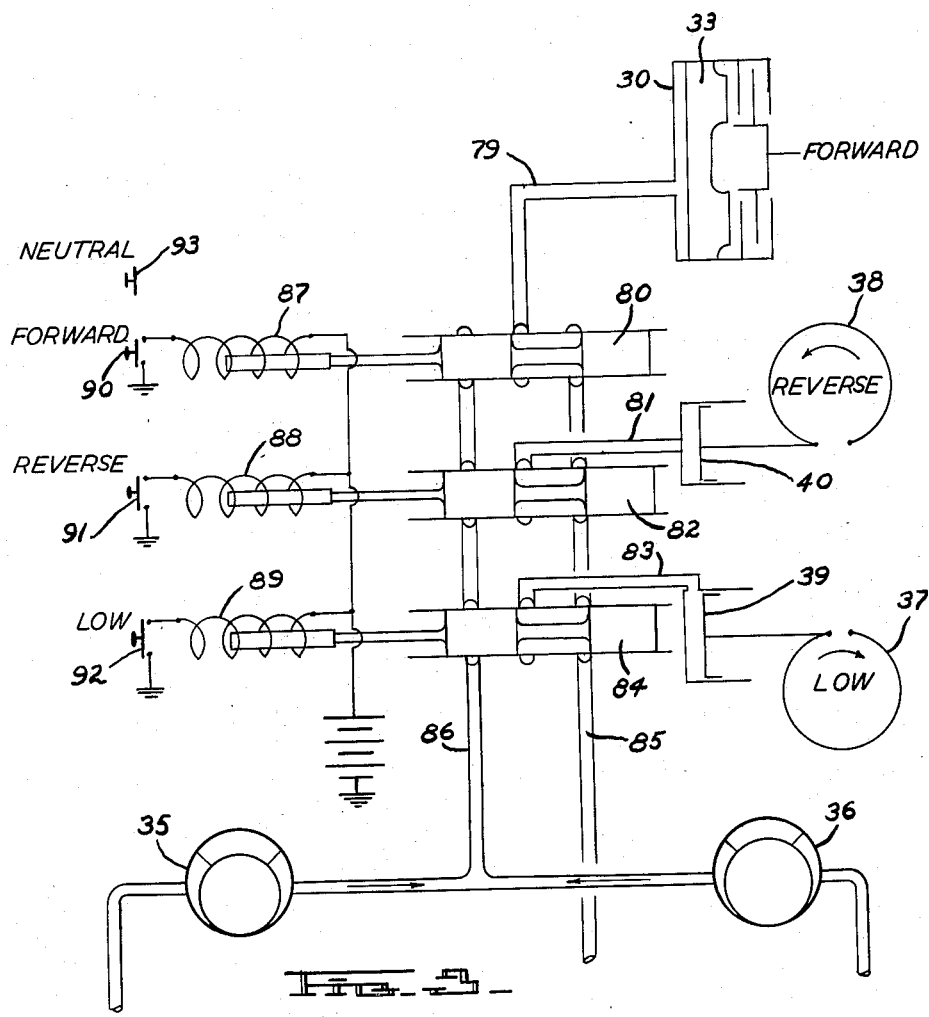
|  | RATIO | CLUTCH | REV. | LOW |
|---|---|---|---|---|
| NEUTRAL | .0 | OUT | OFF | OFF |
| LOW | 2.9 | OUT | OFF | ON |
| INT. | 1.5 | IN | OFF | OFF |
| DIRECT | 1.0 | IN | OFF | OFF |
| REVERSE | 1.2 | OUT | ON | OFF |
E. C. McRAE
INVENTOR.
BY J. R. Faulkner
T. H. Oster
ATTORNEYS

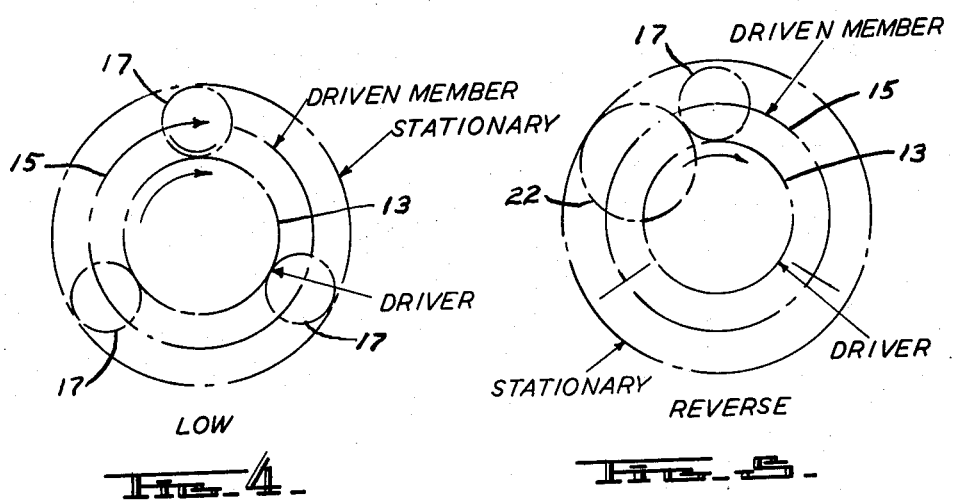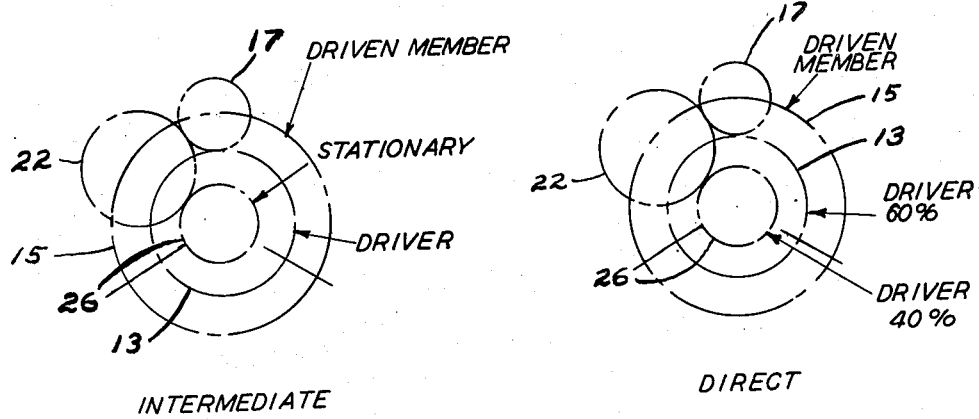

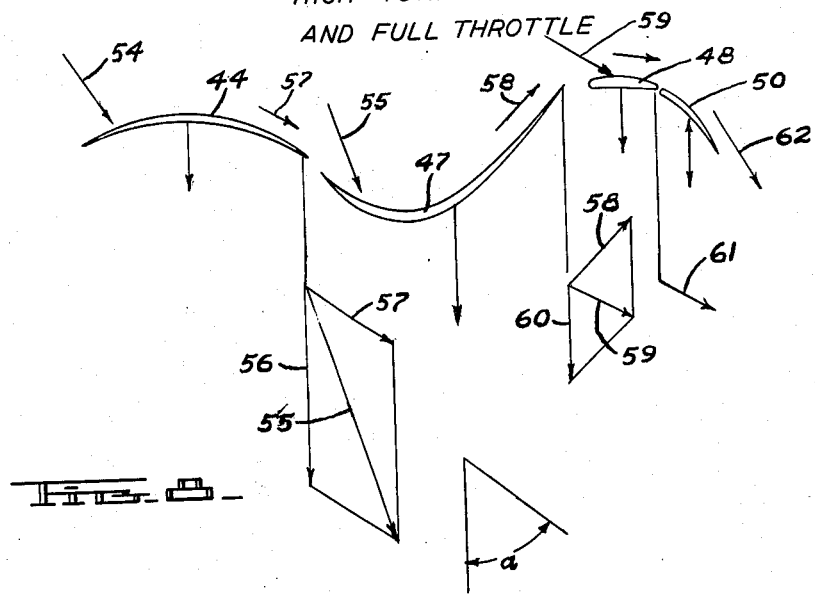
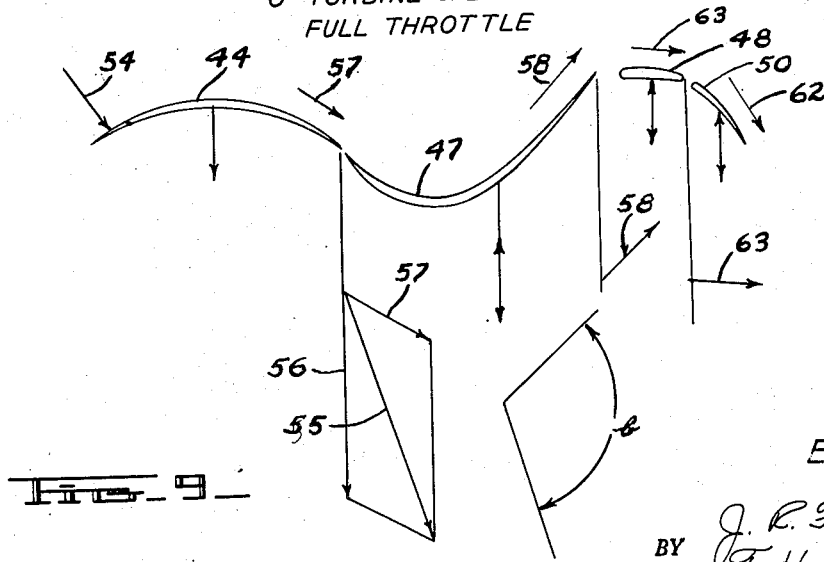

Jan. 6, 1953　　　　　E. C. McRAE　　　　2,624,215
VEHICLE TRANSMISSION
Filed Sept. 28, 1949　　　　　　　　7 Sheets-Sheet 5
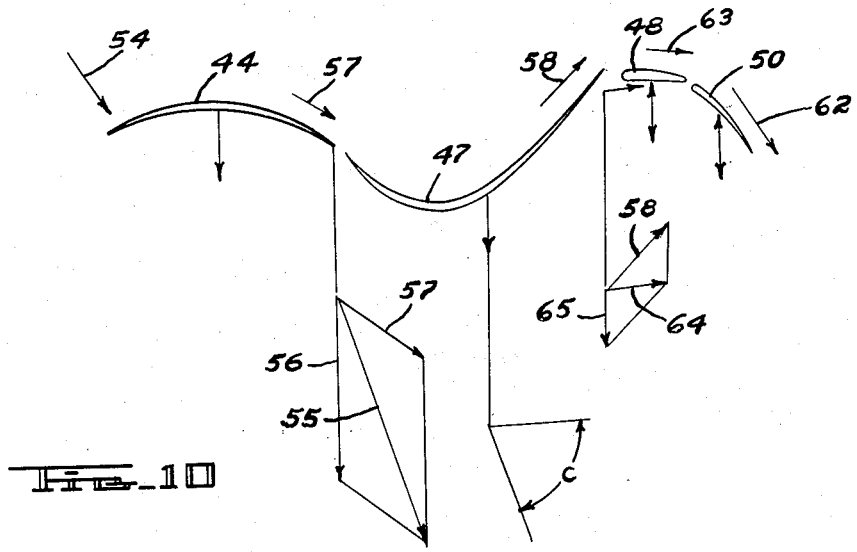
Fig. 10 — FORWARD 50% TURBINE SPEED FULL THROTTLE
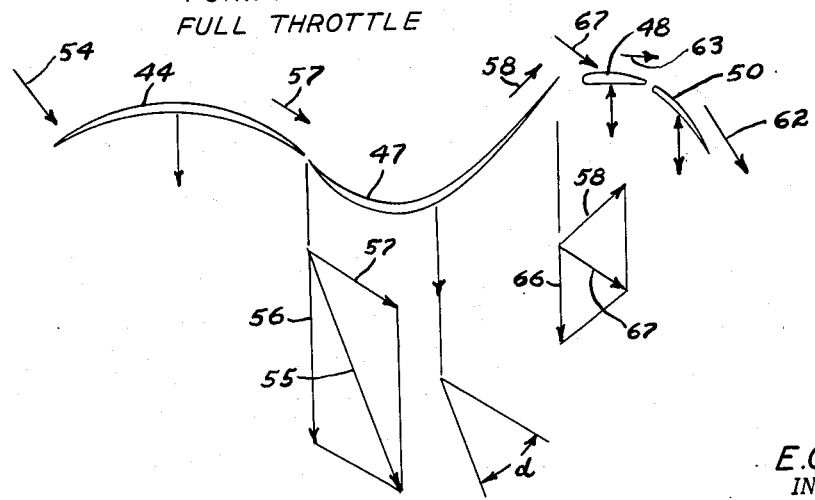
Fig. 11 — FORWARD FULL TURBINE SPEED FULL THROTTLE
E. C. McRAE
INVENTOR.
BY J. R. Faulkner
T. H. Oster
ATTORNEYS

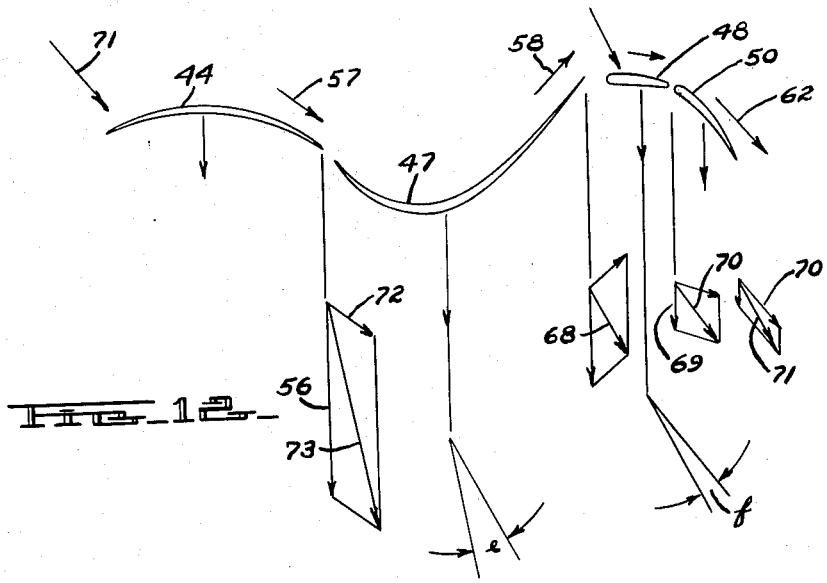
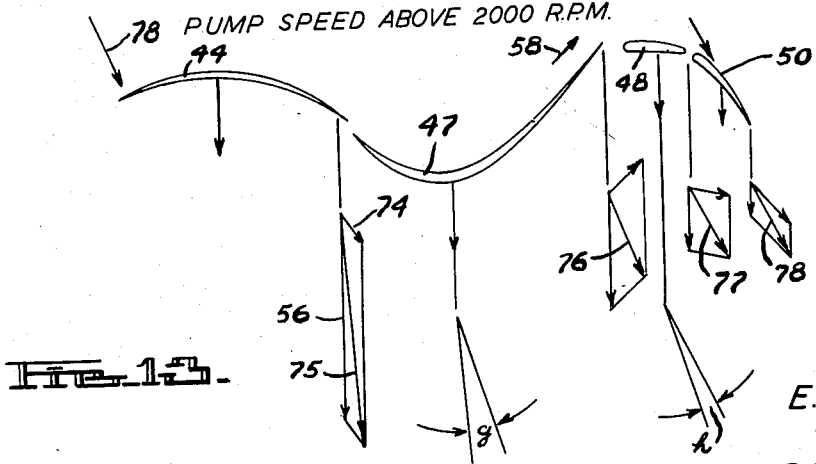

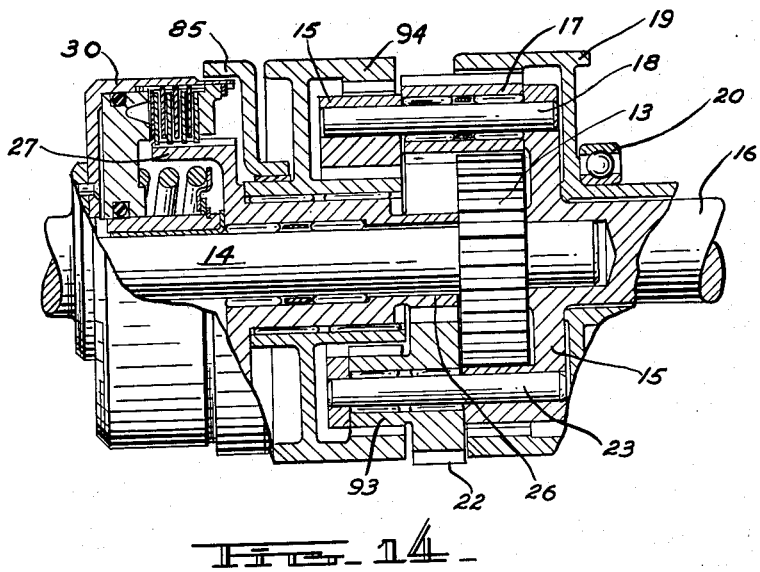
Fig. 14
| | RATIO |
|---|---|
| NEUTRAL | .0 |
| LOW | 2.8 |
| INT. | 1.5 |
| DIRECT | 1.0 |
| REVERSE | 2.0 |
Fig. 16
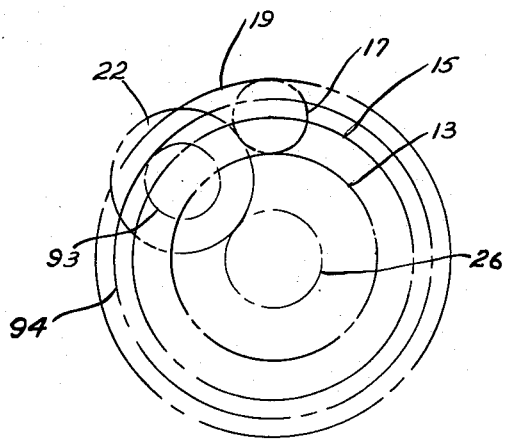
Fig. 15
E. C. McRAE
INVENTOR Patented Jan. 6, 1953

2,624,215

UNITED STATES PATENT OFFICE 2,624,215

VEHICLE TRANSMISSION

Edwin C. McRae, Dearborn, Mich., assignor to Ford Motor Company, Dearborn, Mich., a corporation of Michigan Application September 28, 1949, Serial No. 118,265

5 Claims. (Cl. 74—677)

An object of my invention is to provide a fully automatic transmission especially suitable for automotive vehicles, which transmission will provide three forward speed ratios in conjunction with the variable torque amplification obtained with a hydraulic torque converter. The torque converter for this transmission may thus be designed with relatively low torque amplification which permits more efficient operation of the converter under normal conditions.

A further object of my invention is to provide a transmission in which the low, reverse and intermediate speed ratios are manually engaged and in which the direct drive is automatically engaged in accordance with the speed and torque characteristics encountered in driving. A feature which is believed to be unique in this transmission is that the changeover from intermediate to direct drive is accomplished without the engagement or disengagement of any clutch, band or other friction absorbing elements.

A further object of my invention is to provide a transmission in which the shift from intermediate to direct drive is accomplished in accordance with the vehicle speed and torque requirements and which is accomplished without the use of a speed governor or torque responsive control element.

With these and other objects in view, my invention consists in the arrangement, construction and combination of the various parts of my improved transmission, as described in the accompanying specification, claimed in my claims and illustrated in the accompanying drawings, in which:

Figure 1 is a vertical, longitudinal sectional view through my transmission and torque converter assembly.

Figure 2 is a chart showing the ratios obtained for each speed in the transmission, together with a listing of which clutch or band is engaged for each speed.

Figure 3 is a schematic diagram of a push button control for this transmission.

Figures 4, 5, 6 and 7, respectively, are diagrammatic views of the gearing which comes into play during low, reverse, intermediate and direct speeds.

Figures 8 through 13 are flow diagrams of the torque converter under various conditions of operation. These figures are intended to bring out by means of vector diagrams the functions of the several elements of the converter to automatically shift from intermediate to direct drive solely in accordance with speed and torque conditions and independently of any operation by the operator of the vehicle.

Figure 14 is a vertical longitudinal sectional view thru an alternate form of transmission.

Figure 15 is a diagrammatic view of the gearing shown in Figure 14, and

Figure 16 is a chart showing the ratios obtained with the gearing shown in Figures 14 and 15.

Referring to Figure 1 of the accompanying drawings, I have used the reference numeral 10 to indicate a transmission case, and the numeral 11 to indicate a torque converter case or housing. The torque converter housing 11 is bolted in the conventional manner to the flywheel end of an engine and the transmission case is bolted to the rear end of the torque converter case. A housing 12 is bolted to the rear end of a transmission case in the conventional manner.

Mounted within the transmission case 10 I have provided planetary gearing and a hydraulically operated clutch. The gearing is of the conventional double planetary type heretofore widely used in transmissions. However, to make the operation clear the individual parts will be described. This gearing comprises a relatively large sun gear 13 which is formed integrally with a driveshaft 14. The shaft 14 extends from the torque converter rearwardly through the transmission case to the sun gear 13 and forms the sole driving member for the low and reverse gear ratios. This shaft also transmits about 65% of the driving torque for direct speed. A planet carrier 15 is formed integrally with a final drive shaft 16, which final drive shaft extends rearwardly from the rearmost end of the driveshaft 14 to the propeller shaft of the vehicle. All speed ratios of the vehicle are transmitted through the shaft 16. The rear end of the shaft 14 is rotatably mounted in the forward end of the shaft 16, the drive between these two elements being effected by planetary gearing.

Spaced around the sun gear 13 I have provided three planet pinions 17 which are rotatably mounted upon pins 18 in the planet carrier 15. A low speed ring gear 19 is rotatably mounted by means of a ball bearing assembly 20 upon the rear cover plate 21 of the housing 10. The final drive shaft 16 is rotatably mounted within the hub of the ring gear 19 so that the ring gear, planet carrier, and drive shaft are concentrically and rotatably supported by means of the bearing 20.

The low speed gear ratio is shown diagrammatically in Figure 4 from which it will be seen that when the ring gear 19 is held from rotation and torque is applied to the sun gear 13 the planet carrier 15 will be rotated in the direction of the applied torque at a much reduced speed. This is, of course, a conventional, simple planetary gear set and is described solely to bring out the functioning of the transmission.

The reverse speed of the transmission is accomplished by means of a second planetary gear set in cooperation with the low speed set which has just been described. The reverse gear consists of reverse speed planet gears 22 which are rotatably mounted upon pins 23 fixed in the planet carrier 15. The planet gears 22 are in position to mesh with the forward ends of the planet pinions 17. A reverse speed ring gear 24 is rotatably mounted in a center supporting plate 25 in a position to mesh with the outer teeth of the reverse speed planet gears 22. As shown in Figure 5, when the sun gear 13 is rotated and the ring gear 24 is held from rotation, torque is applied to the pinions 17 which in turn rotate the reverse pinions 22 to cause the carrier 15 to travel in a reverse direction at a reduced speed. This reverse gear set is also well known and is extensively used for effecting a reverse speed in transmissions.

A reactor sun gear 26 is rotatably mounted upon the shaft 14 just forwardly of the sun gear 13 and is arranged to mesh with the reverse speed planet gears 22. When the reactor gear 26 is held from rotation and torque is applied to the sun gear 13 an intermediate speed ratio is effected, as shown in Figure 6. The planet carrier, under these conditions, rotates in the same direction at a ratio of about 65% of the speed of the driving gear 13. This speed ratio depends upon the relative sizes of the gears 13 and 26 and in general, the smaller that the gear 26 is made in relation to the gear 13, the faster the carrier 15 will travel in relation to the gear 13.

When the sun gears 13 and 26 are both rotated at the same speed in the same direction, the entire planetary system will rotate as a unit. This characteristic of this gearing is used to effect direct drive, as shown in Figure 7. No positive clutch is provided herein for locking the gears 13 and 26 together but means is provided for transmitting driving torque in a forward direction to both of these gear members. The amount of torque applied to each of these gears is in the ratio of their respective diameters. Gear 13, as shown in the drawing, is about twice the diameter of gear 26 and in direct drive transmits about twice as much torque as is transmitted by the gear 26.

Consequently, the two gears in direct drive will rotate in synchronism with each other and will therefore lock up the planetary gearing to effect the direct drive.

Means is provided for holding the gear 26 against rotation in a reverse direction to effect an intermediate speed ratio, which means comprise an overrunning clutch and a hydraulically operated disc clutch. A clutch hub 27 is formed integrally with the reactor sun gear 13 and a series of clutch plates 28 are splined to the hub 27. These plates are alternated with other clutch plates 29 which are splined to a clutch housing 30. The housing 30 is fixedly secured to a sleeve 31 which extends therefrom forwardly to one of the reactor members in the torque converter. An overrunning brake 32 is fixed to the forward wall of the housing 10 and extends therefrom to the sleeve 31 to thus at all times prevent the sleeve 31 and clutch housing 30 from rotating in a reverse direction. The sleeve and clutch is, of course, free at all times to rotate in a forward direction.

A piston 33 is reciprocally mounted in the clutch housing 30 and is resiliently urged to its inoperative position by means of a compression coil spring 34. When fluid under pressure is applied between the housing 30 and the piston 33 the clutch plates 28 and 29 are urged together to thereby frictionally connect the sun gear 26 with the sleeve 31. A suitable oil passageway is provided through the shaft 14 to conduct oil under pressure to the piston 33.

From the foregoing it will be seen that when the clutch 30 is engaged, the sun gear 26 will be held from rotation in a reverse direction by means of the overrunning clutch 32. The gear 26 and clutch 30 will, however, be free to rotate in a forward direction. Consequently, to engage the intermediate speed of the transmission it is only necessary to engage the clutch 30 and apply torque to the sun gear 13. The reactor gear 26 being prevented from rotation in a reverse direction by the overrunning clutch 32 causes the planet carrier 15 to travel forwardly at the intermediate speed ratio.

When either low speed or reverse speed ratios are engaged it is necessary that the clutch 30 be disconnected, as in each of these gear ratios the reactor pinion 26 must rotate in a reverse direction. However, in neither low nor reverse speed is any work done by the gear 26 so that it simply floats in a reverse direction on the shaft 14. Anti-friction bearings are provided for the planet pinions and planet gears as well as for the reactor gear 26. A suitable low speed brake band 37 is positioned around the low speed ring gear 19 and a reverse speed band 38 is positioned around the reverse ring gear 24. Suitable hydraulically operated pistons are provided to clamp these bands to their respective drums and thus hold them from rotation. These pistons are shown diagrammatically in Figure 3 by numerals 39 and 40, respectively.

As is customary in automatic transmissions, I have provided a gear type oil pump 35 which is driven by the vehicle engine and have provided second oil pump 36 which is driven by the final drive shaft of the vehicle. Two pumps are provided so that when the engine is running, fluid under pressure may be obtained from the forward pump 35 to operate either the reverse or low speed bands or the clutch 30. If it is desired to start the engine by pushing the car, then fluid from the rear pump 36 is available to operate the clutch 30 or the two brake bands. In descending steep grades it is desirable to engage the low speed band to use the motor as a very effective brake. In this case it is desirable to be able to use fluid from either the pump 35 or 36 to engage the low band. The provision of two independently operated oil pumps is well known and no claim is made herein to this construction.

The torque converter unit of my transmission is shown in Figure 1 and comprises a driving plate 41 which is bolted to the rear flange of an engine crankshaft 42. The periphery of the disc 41 is bolted to a conventional torque converter pump element 43, which element is provided with pump vanes 44 in the conventional manner. A hub 45 projects from the rear end of the pump element 43 to the oil pump 35 and drives the pump 35 at all times that the engine is in operation.

A turbine 46 is rotatably mounted within the pump element 43, which turbine is provided with turbine blades 47 of conventional design. The turbine 46 is fixedly secured to a hub 47', which in turn is splined to the forward end of the shaft 14. Thus, the turbine member 46 drives the shaft and sun gear 13 at all times that the engine is operating.

The reactor member of the converter unit is of the split type, the leading portion being free to rotate independently of the rear portion. Heretofore converter reactor members have been split and mounted upon overrunning clutches to obtain more efficient operation of the converter over its full range. More specifically, the reason for splitting the reactor has been to provide a more efficient entrance angle for the fluid from the turbine under various turbine speeds. In this transmission the reactor member is split but, as will be more fully brought out in the description of the flow diagrams, the reactor member is split for the purpose of providing a division of torque output. The forward portion of the reactor member is given the numeral 48, which portion is fixedly secured to a hub 49, which in turn is splined to the forward end of the sleeve 31. Thus, the forward portion of the reactor member is at all times positively connected to the clutch member 30 by means of the sleeve 31. The forward portion of the reactor member is thus prevented from rotation in a reverse direction by the overrunning brake 32. The brake 32 thus serves to prevent reverse rotation of both the reactor element 48 and the reactor sun gear 26.

The rearward portion of the reactor member is given the numeral 50 and is mounted on an overrunning brake 51, which in turn is splined to the forward end of a sleeve 52. The rear end of the sleeve 52 is fixedly secured to the forward face of the transmission housing 10. The rear reactor element 50 is thus prevented from rotation in a reverse direction at all times by means of the overrunning brake 51.

Referring to the flow diagrams, 8 through 13, these diagrams are intended to show graphically the flow of fluid around a mean path 53 through the torus of the converter. These diagrams also show by vector diagrams the reaction forces involved under each of the conditions encountered.

Referring to Figure 8, I have shown the conditions encountered when the transmission is operating in low and reverse speed ratios under full throttle with the turbine operating at a relatively high speed. Arrow 54 shows the direction of the fluid as it emerges from the rear element 50 of the reactor just as it is picked up by the pump vanes 44. Arrow 55 shows the direction and the speed of the fluid as it emerges from the pump vanes 44. The length and angle of the arrow 55 is arrived at from the associated vector diagram in which arrow 56 represents an increment of pump rotation and arrow 57 represents the direction and velocity of the fluid emerging from the pump vanes 44. The difference in angle and length of the arrows 54 and 55 represent the amount of energy induced into the fluid by movement of the pump vanes 44.

The fluid emerging from the pump, as represented by arrow 55, is impressed upon the turbine vanes 47 where its direction is altered according to the speed of the turbine. The exit angle of the turbine is shown by arrow 58. However, when the turbine is rotated at nearly engine speed the direction of flow of the fluid from the turbine blade is represented by arrow 59, arrived at from the vector diagram in which arrow 58 represents the exit angle of the turbine blades and the velocity of the fluid and arrow 60 represents the forward movement of the turbine blades. Arrow 60 is only about half the length of arrow 56 because the radius of the turbine blades where the fluid emerges is only half the radius of the leading edges of the turbine blades. Consequently, the exit edges of the blades have only half the circumferential velocity of the leading edges. The angular difference between the arrows 55 and 59 represents the amount of energy absorbed by the turbine. This angle, designated by angle (a) is a fairly accurate representation of the torque impressed upon the turbine.

The fluid, as represented by arrow 59 strikes the forward element 48 of the reactor on the rear faces of the blades so that this element is driven forwardly until it reaches a velocity at which the fluid emerging therefrom is directed at the same angle as arrow 59. The direction of the fluid emerging from the first element of the reactor member is shown by arrow 61. However, as the angle of arrow 61 is less than the exit angle from the reactor member 50, as shown by arrow 62, the reactor member 50 will be urged in a rearward direction. The overrunning brake 51 prevents reverse movement of the member 50 so that the fluid emerges from the reactor member 50 in the direction of arrow 62. Arrow 62 represents the same direction and speed as was originally designated by arrow 54.

From the foregoing it will be seen that energy is imparted into the fluid by means of the pump 44 which energy is partially absorbed in the turbine 47. Inasmuch as the forward portion 48 of the reactor is free to rotate in a forward direction no energy is absorbed in this member. The principal loss in the converter under these conditions is caused by the rear reactor 50 which must change the direction of fluid from that illustrated by arrow 61 to that shown by arrow 62. The operation of the transmission in low and reverse permits the free forward movement of the member 48, as the clutch 30 is disengaged during both of these speeds.

The operation of the converter in low and reverse is conventional for split reactor converters and, of course, no claim is made to this construction.

Referring to Figure 9, I have shown the forces involved in forward starting when the turbine is held stationary and full engine throttle is applied. The same reference numerals have been used to indicate fluid velocities of the same magnitude, as were used in Figure 8. It will be noted from Figure 9 that the fluid emerging from the turbine is shown by arrow 55. However, the fluid as it leaves the stationary turbine member emerges at the exit angle of the turbine blades, as represented by arrow 58. It is then impressed upon the forward faces of the reactor blades of element 48 inasmuch as the direction of fluid shown by arrow 58 is in a reverse direction. The member 48 will thus be urged in a reverse direction. Reverse movement of the member 48 is prevented by the overrunning brake 32 so that the fluid emerges from the element 48 in the direction shown by arrow 63. The entrance and exit angles of the blades of element 48 are both substantially zero. The fluid then strikes the leading edge of the rear reactor member 50 and is directed forwardly in the direction shown by arrow 62. Under these conditions both of the reactor members 48 and 50 are urged in a reverse direction but are prevented from movement in this direction by the overrunning brakes 32 and 51. Angle (b) in this diagram illustrates the angular difference between the arrows 55 and 58 and is a representation of the torque multiplication obtainable at stalling speed of the turbine. This condition is conventional with torque converters of either the split or one piece reactor designs.

Figure 10 illustrates the forces involved when the turbine has attained about 50% of engine speed and full throttle is being applied. It will be noted from this diagram that fluid emerges from the turbine at an angle shown by arrow 64, the angle 64 being obtained from the vector diagram in which arrow 65 represents the forward movement of the rear edges of the turbine blades and arrow 53, the direction and velocity of the fluid from the turbine. Under these conditions the forward reactor member 48 is still prevented from rotating in a forward direction because the fluid is impressed thereon at an angle slightly in reverse of the exit angle 63 of the reactor element 48. The rear reactor member 50 is, of course, also urged in a reverse direction but is held from reverse movement by the overrunning brake 51. The torque amplification under these conditions is illustrated by angle (c) which, as was to be expected, is considerably less than angle (b).

Figure 11 illustrates the forces involved at full turbine speed and full engine throttle. In this figure arrow 66 represents the forward speed of the exit edge of the turbine blade and is considerably longer than arrow 65. From the associated vector diagram it will be noted that the angle of emergence of the fluid from the turbine is shown by arrow 67. The fluid, as represented by arrow 67, strikes the rear faces of the forward turbine member 48. If the transmission were in low or reverse this angle of attack would cause the member 48 to rotate forwardly. However, when the transmission is in intermediate speed, substantially one-half the torque applied by the turbine is transmitted in a reverse direction through the planetary gearing to the reactor sun gear 26. This torque urges the reactor gear 26 in a reverse direction with about half turbine torque. The reactor gear 26 cannot rotate in a reverse direction, due to the overrunning brake 32, but before it can rotate forwardly this applied torque must be overcome. Consequently, at full turbine speed and full throttle, as shown in Figure 11, the reactor member 48 still remains stationary. Under this condition the vehicle operates at intermediate speed and will continue to so operate until the turbine torque drops off sufficiently to permit the fluid to rotate the element 48 in a forward direction. The torque amplification of the turbine member, under conditions illustrated in Figure 11, is shown by angle (d) and is, of course, considerably less than the torque amplification shown by angle (c) in Figure 10.

Referring to Figure 12, I have shown the forces involved when the turbine is operated at practically full engine speed under part throttle conditions. From this figure it will be noted that the angle of the fluid as it emerges from the turbine is shown by arrow 69. This angle is greater than that shown in Figure 11 by arrow 67 and is sufficiently greater to overcome the reverse torque impressed upon the forward reactor gear 26 by the forward torque of the turbine member 47. The force of the fluid in the direction of arrow 68 causes the reactor 48 to rotate forwardly to the extent shown by arrow 69. The fluid as it emerges from the reactor member 48 is shown by arrow 70, which angle is slightly greater than the stationary exit angle of the reactor member 50. The reactor member 50 is therefore urged in a forward direction. The overrunning brake 51 permits such forward rotation. Inasmuch as the flow of fluid from the reactor 50, as shown by arrow 71, is at a greater angle than that shown in the preceding figures by arrow 54, the pump member can operate at a higher speed or, in other words, for a given angular increment of pump rotation the toroidal speed of the fluid will be less. This reduced toroidal speed is shown graphically by arrow 72 for an increment of pump rotation equivalent to that shown by arrow 56. However, due to the reduced toroidal speed of the fluid, the resultant fluid speed from the pump is shown in this vector diagram by arrow 73. The torque amplification in the turbine element is therefore the difference in angular relationship between the arrows 73 and 68 and is shown by angle (e). The torque amplification of the forward turbine element 48 is shown graphically by angle (f) and is arrived at by the difference in angles between the arrows 68 and 70.

Under these conditions it will be seen that the major portion of the torque amplification is represented by angle (e) on the turbine 47, while about half of this torque, shown by angle (f), is impressed upon the forward reactor member 48. Both forces are in a forward direction. Under these conditions the turbine element drives the sun gear 13 at about two-thirds engine torque while the forward reactor member 48 drives the reactor gear 26 at about one-third engine torque. Inasmuch as these torque ratios are about two to one, the planetary gearing will, in effect, be locked up to drive the car in direct drive.

The novel feature of this transmission is that the shift from intermediate speed drive to direct drive, as illustrated in Figure 12, occurs without the engagement of any clutches or bands or without the operation of any speed or torque governor. It should also be kept in mind that if, under the conditions shown in Figure 12, the throttle is fully opened the converter will immediately revert to the conditions, shown in Figure 11, which is the intermediate speed condition. If now the throttle is partly closed the transmission will again lock up as illustrated in Figure 12. This change in speed ratio will occur automatically and briefly represents the invention for which application is herein being made.

Figure 13 illustrates the forces involved when the engine is operating at high speed with both the turbine and forward reactor member operating at nearly engine speed. In this case the toroidal velocity of the fluid is still further reduced as shown by arrow 74 for each angular increment of pump rotation. The direction of the fluid emerging from the pump is shown by arrow 75 while the direction of the fluid emerging from the turbine is shown by arrow 76. The direction of the fluid emerging from the reactor member 48 is shown by arrow 77 and that emerging from reactor 50 is shown by arrow 78. This is the condition encountered when the vehicle is operating at high speeds under full throttle. Under these conditions the engine torque is transmitted partly by the turbine 47 and partly by the forward reactor member 48. The division of torque is shown respectively by angles (g) and (h) which will continue to drive the car in direct drive. If now the throttle is reduced, the conditions revert back to those shown in Figure 12. However, in both of these cases the transmission stays in direct drive and will remain so until the engine speed is reduced to above 2000 R. P. M.

It may give some concern that the gears 13 and 26, in direct drive, are not positively locked in synchronism and are only held in synchronism by the forces impressed upon the turbine member 47 and reactor member 48. This, however, is of little concern because it is immaterial, as far as the direct drive ratio is concerned, as to what means is employed for holding these gears in synchronism. It will be noted that any conditions which cause the reactor 48 to run behind the turbine 47, will immediately increase the angles (h) or (f) and thereby increase the proportion of torque transmitted by the reactor 48. As the torque transmitted by the reactor 48 must only equal half that transmitted by the turbine 47, the member 48 will remain substantially in synchronism with the turbine 47 without a positive coupling together of these two members.

While I have shown and described a split reactor member in this transmission, it may be possible to obtain satisfactory results by the use of a solid reactor. It is only necessary that the reactor, under normal driving conditions, be rotated in a forward direction with sufficient torque to drive the reactor gear. One way that this may be accomplished is to extend the leading edges of the reactor blades part way up around the torus to thereby produce a better coupling effect. It will be apparent that the absorption of energy by the turbine member is accomplished in part because the turbine reduces the circumferential velocity of the fluid when it directs the fluid inwardly to the center of the torus. If the reactor is used to direct the fluid inwardly still further after it leaves the turbine, the reactor will absorb a portion of the kinetic energy in the fluid and thereby be rotated forwardly.

This variation is sufficiently probable that I have claimed both constructions in the claims of this application.

Figure 2 shows the comparatively simple clutch and brake band arrangement for effecting the various speeds of the transmission. It will be seen from this figure that in neutral the clutch 30 is disengaged and that both the reverse band 38 and the low speed band 37 are disengaged. In neutral the turbine 46 operates at practically engine speed but the carrier 15 may remain stationary because the low speed drum 19 is free to rotate in a reverse direction, the reverse drum 24 is free to rotate in a forward direction, and the reactor gear 26 is free to rotate in a reverse direction.

When low gear is desired it is only necessary to engage the band 37 which holds the drum 19. The clutch 30 remains out of engagement and the reverse band remains off.

For normal forward driving intermediate speed is engaged. To effect such speed it is only necessary to engage the clutch 30 to thereby hold the reactor gear 26 from reverse rotation.

Direct drive, as has been explained, is accomplished automatically and without the engagement of any further member. Reverse speed is obtained by applying the reverse band 38 and disengaging the clutch 30 and the low band 37.

An important advantage of this transmission is that only one friction member need be engaged for each speed ratio. This characteristic permits a relatively simple control for the transmission, one form of which I have shown in Figure 3.

Referring to Figure 3, I have shown a push button type of control for this transmission. A conduit 79 extends from the clutch 39 to a port associated with a forward speed valve 80. A conduit 81 extends from the hydraulic piston member 40 to a port associated with a reverse speed valve 82. Likewise, a conduit 83 extends from the low speed piston 39 to a low speed valve 84. Each of these valves is a simple two-way balance valve. In the neutral position, shown in Figure 3, all of the valves are inoperative, that is, the several actuating pistons are connected to the discharge side of their respective valves so that the pistons are free to return to their inoperative positions. The discharge conduit for the three valves is shown by numeral 85.

A high pressure line for the three valves is shown by conduit 86. It will be seen that when any one of the valves, 80, 82 or 84, is moved to the left high pressure fluid will be conducted to the respective piston. I have shown solenoids for operating these valves. A forward speed solenoid 87 is connected to the valve 80, a reverse speed solenoid 88 is connected to the valve 82, and a low speed solenoid 89 is connected to the valve 84. These three solenoids are independently operated by three electrical switches 90, 91 and 92 respectively. The switches are arranged so that when any one is engaged the other two are thrown out. I have also provided a neutral button 93 which when depressed throws out any one of the three switches 90, 91 or 92.

When starting the engine, the operator presses the neutral button which insures that all three of the switches are out and the clutch and brake bands disengaged. The operator may then start the engine and accelerate it, as is customary practice. When ready to start the car, the operator lets the engine return to idle position and if he desires to go in a forward direction, simply presses the forward switch 90 which energizes the solenoid 87 thereby opening the valve 80 to engage the clutch 30. The transmission starts with a 1.5 to 1 gear reduction plus about 2 to 1 torque converter reduction which gives an overall reduction of about 3 to 1. As the vehicle picks up speed the turbine comes up to engine speed quite rapidly to reduce the overall gear ratio to 1.5 to 1. As the reactor 48 picks up speed, as has been previously explained, the gear ratio automatically goes into direct drive.

For all normal driving in a forward direction no further manipulation of the control switches need be made. However, if a steep incline is encountered or severe operating conditions are encountered, which call for a greater gear reduction than that obtainable in intermediate speed, the operator presses the low speed button 92 which disengages the forward speed button 90 thereby applying the low speed band 37 and disengaging the clutch 30. Operation of the low speed gearing then comes into effect. This gear is a product of the low speed reduction times the torque converter ratio.

If reverse speed is desired the reverse speed button is pressed to effect the reverse speed in like manner. A desirable characteristic of this transmission is that the reverse and low speed buttons may be actuated any time regardless of the motion of the car so that the car can be rocked by altering the direction of torque on the drive shaft to get out of ruts or the like. This is a decided advantage over some other automatic transmissions, known to the applicant, in which a positive dog must be engaged to effect the reverse speed operation.

Referring to Figure 14, I have shown an alternate design of gearing which produces a reverse speed gear ratio more suitable for automotive use than the ratio shown in Figure 1. This gearing differs from that shown in Figure 1 only in that a pinion 93 is formed integrally with each reverse planet gear 22, which pinions mesh with a reverse ring gear 94. In the Figure 1 design the planet gears 22 mesh directly with the reverse ring gear. The size of the pinions 93 control the gear ratio in reverse and when made in the proportions shown produces a reverse gear ratio of 1 to 2.7.

Figure 15 shows diagrammatically the direction of forces involved in this design of gearing. The low speed gear ratio and intermediate speed gear ratio are both the same as in the gearing shown in Figure 1 so that they will not further be described.

Figure 16 is a chart showing the gear ratios obtainable with the gearing design shown in Figures 14 and 15.

Among the many advantages accomplished with the use of my improved transmission is that a relatively high axle gear ratio may be used without sacrificing acceleration. A further advantage is that the direct drive clutch need be capable of transmitting only one-half of the torque delivered by the converter turbine, which in most installations will not exceed twice engine torque. The clutch need therefore transmit only engine torque. Consequently, relatively low oil pressures are sufficient to operate this clutch. A further, and perhaps the most important advantage of this transmission, is that the changeover from intermediate speed ratio to the direct drive ratio is effected without the engagement of any clutch or band and without the functioning of speed or torque governors.

Some changes may be made in the arrangement, construction and combination of my structure without departing from the spirit of my invention and it is my intention to cover by my claims such changes as may reasonably be included in the scope thereof.

I claim as my invention:

1. In a power transmission, a torque converter comprising a pump member and a turbine member and a split reactor member, the leading element of said reactor member having substantially zero entrance and exit angles and the rear element of said reactor member having a substantially zero entrance angle and a positive exit angle, overrunning brakes independently preventing reverse rotation of both of said reactor elements, double planetary reduction gearing having a sun gear for each of said planetary reductions and having a common planet carrier, the first of which sun gears when held from reverse rotation and when torque is applied to the other sun gear in a forward direction drives said carrier forwardly at a reduced speed, and the first of which sun gears when driven in synchronism with said other sun gear produces a direct drive of said carrier, means for operatively connecting the leading element of said reactor member to the first-mentioned of said sun gears, and means for fixedly connecting said turbine member to the other of said sun gears.

2. In a power transmission, a torque converter comprising a pump member and a turbine member and a split reactor member, the leading element of said reactor member having substantially zero entrance and exit angles and the rear element of said reactor member having a substantially zero entrance angle and a positive exit angle, an overrunning brake preventing reverse rotation of the rear element of said reactor member, a planet carrier having a plurality of planet pinions rotatably mounted thereon, a sun gear rotatably mounted within said carrier in mesh with said planet pinions, means for fixedly connecting said sun gear with said turbine member, a plurality of reverse planet gears rotatably mounted upon said carrier in mesh with said planet pinions, a reactor sun gear rotatably mounted within said carrier in mesh with said reverse planet gears, means operatively connecting said reactor gear with the leading element of said reactor member, and an overrunning brake preventing reverse rotation of said means for connecting said reactor gear with the leading element of said reactor member.

3. In a power transmission, a torque converter comprising a pump member and a turbine member and a split reactor member, the leading element of said reactor member having substantially zero entrance and exit angles and the rear element of said reactor member having a substantially zero entrance angle and a positive exit angle, a one-way brake preventing reverse rotation of said rear reactor element, a planet carrier having a plurality of planet pinions rotatably mounted therein, a sun gear rotatably mounted within said carrier in mesh with said planet pinions, a shaft fixedly connecting said sun gear with said turbine, a low speed ring gear disposed around said carrier in mesh with said planet pinions, a plurality of reverse planet gears rotatably mounted upon said carrier in mesh with said planet pinions, a reactor sun gear rotatably mounted within said carrier in mesh with said reverse planet gears, a reverse speed ring gear disposed around said carrier in mesh with said reverse planet gears, means to selectively prevent rotation of said low speed ring gear and said reverse speed ring gear, a sleeve disposed around said shaft extending from the leading element of said torque converter rearwardly to a position adjacent to said reactor sun gear, said sleeve being fixedly connected to said leading element, a clutch disposed between said sleeve and said reactor gear by means of which said gear may be operatively connected to said sleeve, and a one-way brake preventing reverse rotation of said sleeve.

4. In a power transmission, a torque converter having pump and turbine members and a pair of adjacent reactor members, the leading reactor member having small entrance and exit angles and the rear reactor member having a small entrance angle and a considerably larger exit angle, an overrunning brake preventing reverse rotation of the rear reactor member, a planet carrier, a plurality of planet pinions rotatably mounted upon said planet carrier, a sun gear meshing with said planet pinions, means connecting said sun gear to said turbine member to be driven thereby, a plurality of reverse planet gears rotatably mounted upon said carrier in mesh with said planet pinions, a second sun gear meshing with said reverse planet gears, means operatively connecting said second sun gear to said leading reactor member to be driven thereby, and an overrunning brake preventing reverse rotation of said leading reactor member.

5. In a power transmission, a torque converter having pump and turbine members and a pair of adjacent reactor members, the leading reactor member having small entrance and exit angles and the rear reactor member having a small entrance angle and a considerably larger exit angle, an overrunning brake preventing reverse rotation of the rear reactor member, a planet carrier, a plurality of planet pinions rotatably mounted upon said planet carrier, a shaft concentric with said planet carrier, a sun gear mounted upon said shaft and meshing with said planet pinions, means connecting said turbine member to said shaft, a ring gear meshing with said planet pinions, a plurality of reverse planet gears rotatably mounted upon said planet carrier in mesh with said planet pinions, a sleeve surrounding said shaft, a second sun gear meshing with said reverse planet gears, a second ring gear meshing with said reverse planet gears, means selectively preventing rotation of said first and second ring gears, means connecting said sleeve to said leading reactor member, a clutch between said sleeve and said second sun gear, and a one-way brake preventing reverse rotation of said sleeve.

EDWIN C. McRAE.

REFERENCES CITED

The following references are of record in the file of this patent:

UNITED STATES PATENTS

| Number | Name | Date |
|---|---|---|
| 2,156,041 | Duffield | Apr. 25, 1939 |
| 2,196,585 | Gette | Apr. 9, 1940 |
| 2,280,015 | Tipton | Apr. 14, 1942 |
| 2,293,358 | Pollard | Aug. 18, 1942 |
| 2,316,390 | Biermann | Apr. 13, 1943 |
| 2,325,876 | Pollard | Aug. 3, 1943 |
| 2,326,994 | Duffield | Aug. 17, 1943 |
| 2,346,365 | Duffield | Apr. 11, 1944 |
| 2,372,817 | Dodge | Apr. 3, 1945 |
| 2,548,207 | Dunn | Apr. 10, 1951 |
| 2,551,746 | Iavelli | May 8, 1951 |